Figure 6:
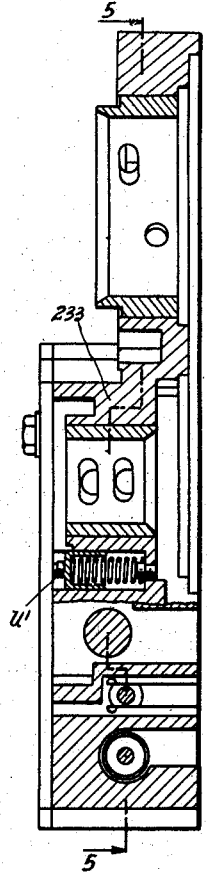

July 7, 1959
HANS-JOACHIM M. FÖRSTER
2,893,267
SPEED CHANGE TRANSMISSION
Filed Dec. 4, 1953
4 Sheets-Sheet 1
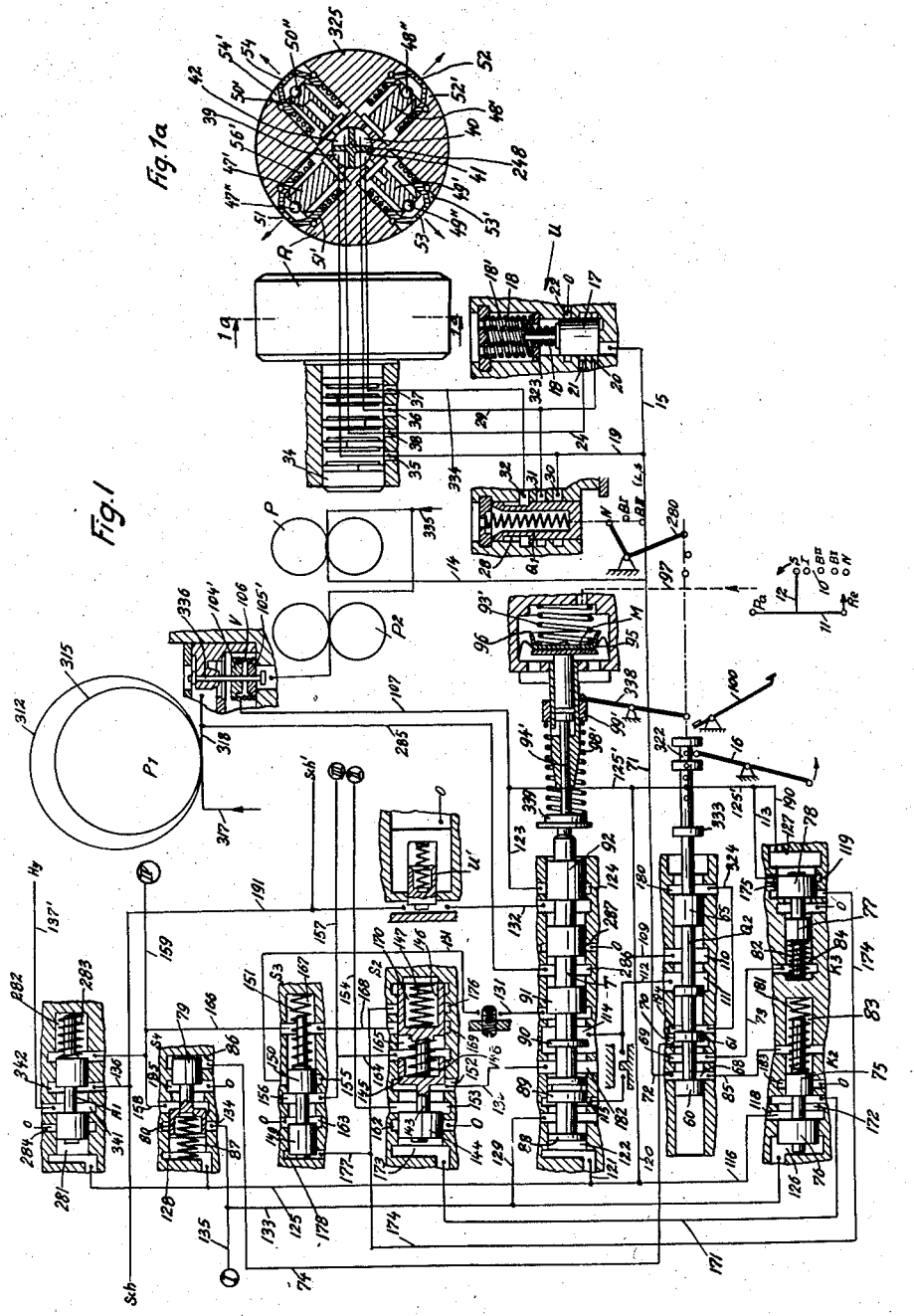
Inventor
HANS-JOACHIM M. FÖRSTER
BY Dicke and Craig.
ATTORNEYS.

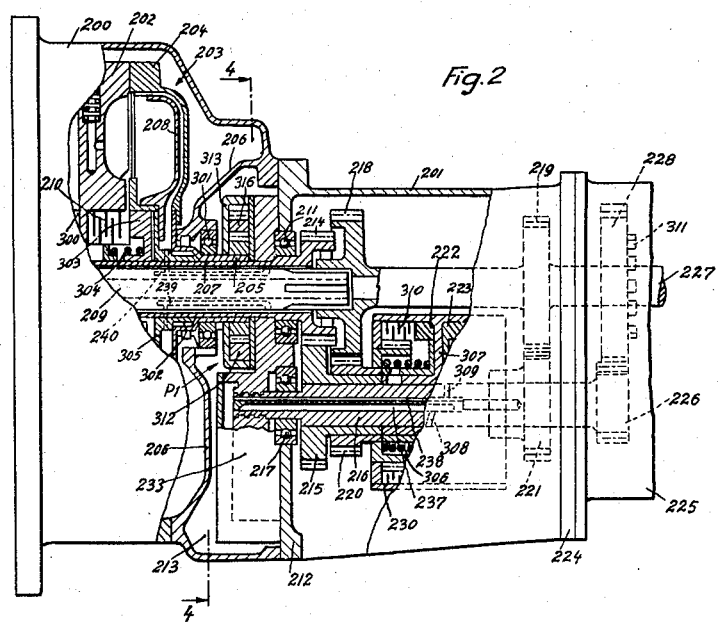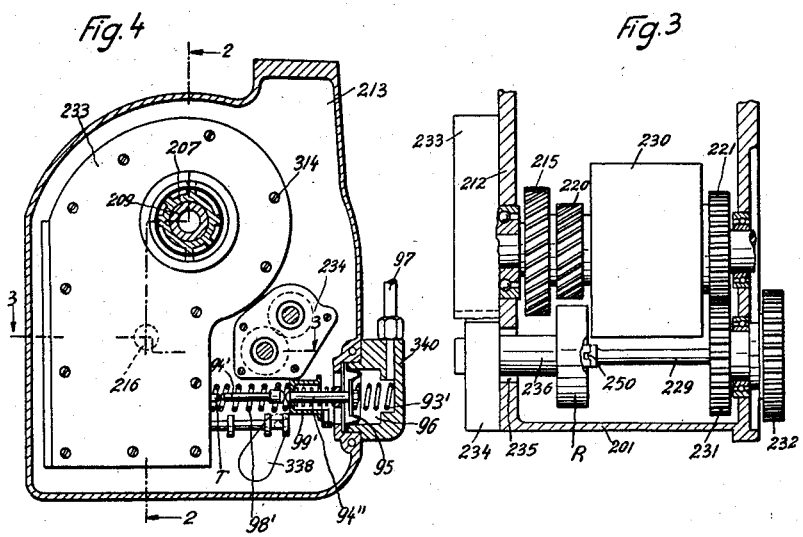

July 7, 1959   HANS-JOACHIM M. FÖRSTER   2,893,267
SPEED CHANGE TRANSMISSION

Filed Dec. 4, 1953 4 Sheets-Sheet 3

Inventor
HANS-JOACHIM M. FÖRSTER
BY Dicke and Craig.
ATTORNEYS.

July 7, 1959     HANS-JOACHIM M. FÖRSTER     2,893,267
SPEED CHANGE TRANSMISSION
Filed Dec. 4, 1953     4 Sheets–Sheet 4
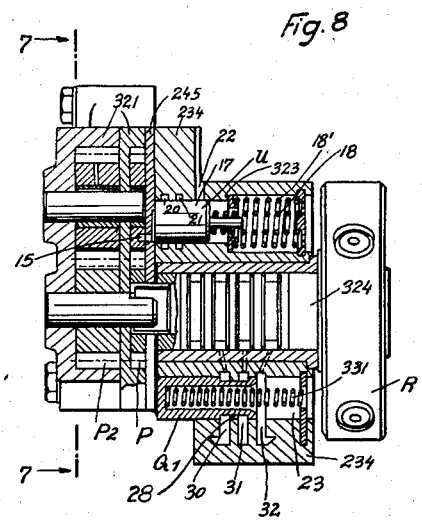
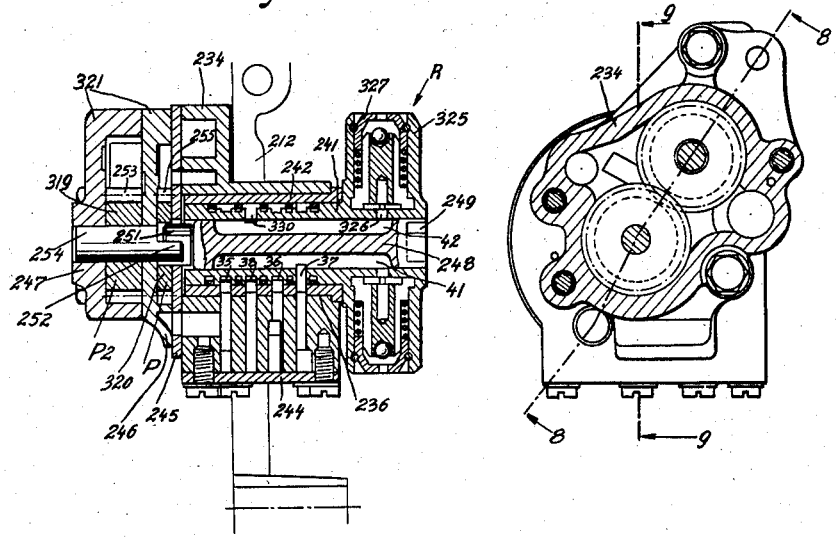
Inventor
HANS-JOACHIM M. FÖRSTER.
BY Dicke and Craig.
ATTORNEYS.

United States Patent Office 2,893,267
Patented July 7, 1959

2,893,267

SPEED CHANGE TRANSMISSION

Hans-Joachim M. Förster, Stuttgart-Bad Cannstatt, Germany, assignor to Daimler-Benz Aktiengesellschaft, Stuttgart-Unterturkheim, Germany Application December 4, 1953, Serial No. 396,196

Claims priority, application Germany December 8, 1952

16 Claims. (Cl. 74—732)

The present invention relates to a speed change transmission and, more particularly, to a transmission for motor vehicles equipped with a control system which will automatically control the transmission in a manner conforming to the requirements arising under different conditions of operation.

More especially, the present invention relates to a variable motor vehicle transmission provided with a control system adapted to set up the transmission in dependence on both the speed of the driven shaft and the driving torque exerted upon the driving shaft of the transmission, such control system including a plurality of pumps, gear shift valves, pilot valves, a pressure control valve, a conditioning valve, and a pressure step controller. A transmission of that kind is disclosed in my co-pending application Serial No. 326,215 filed December 16, 1952, for "Control System for a Variable Motor Vehicle Transmission," now U.S. Patent 2,790,328.

It is the object of the present invention to provide a variable transmission of the kind indicated in which the control system requires a minimum of space and in which the total length of the ducts connecting the elements of the control system is a minimum.

It is another object of the invention to so combine the various elements of the control system, such as the gear shift valves, the associated pilot valves, the pumps, the pressure control valve, the conditioning valve, and the pressure step controller, not including, however, the fluid-operable rams adapted to set up the various ratios of transmission, as to constitute a unit which is mounted in the interior of the transmission in close vicinity to the cooperating elements thereof, such unit being preferably mounted on a partition wall disposed between a chamber containing the hydrodynamic clutch and another chamber accommodating the various gear wheels and associated clutches and actuating rams.

Another object of the present invention is to provide an improved pressure step controller adapted to stepwise increase and decrease the pressure produced by a pump, as the speed of the outgoing shaft of the transmission increases or decreases, such pressure step controller functioning with great accuracy and reliability.

Moreover, it is an object of the present invention to provide improved means for automatically discharging the liquid from the hydrodynamic clutch forming part of the transmission under certain condition of operation, more particularly, whenever the pressure available for the actuation of the hydraulic rams drops below a certain limit.

Figure 5:
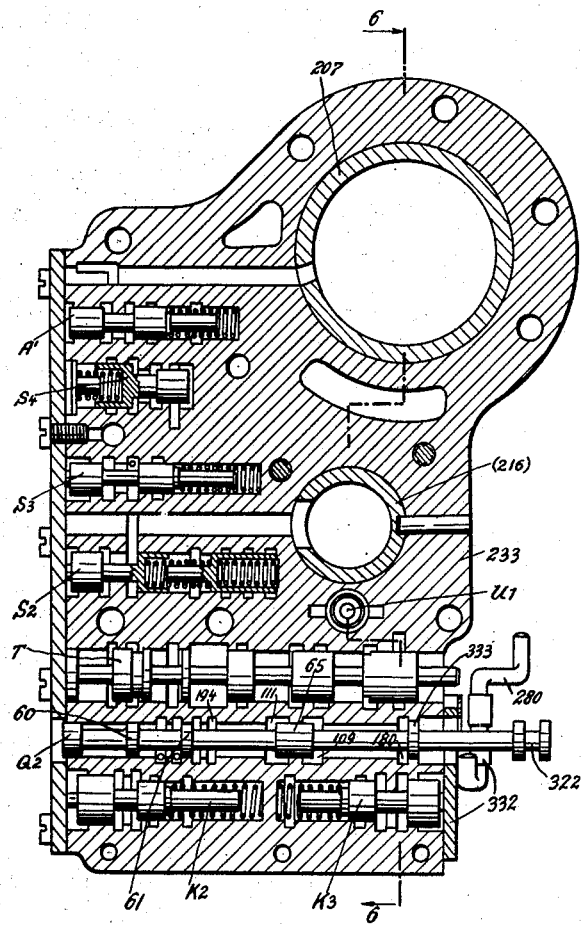

Further objects and features of the present invention will appear from the following description of a preferred embodiment of the invention which is shown in the accompanying drawings, in which Fig. 1 is a hydraulic circuit diagram showing a plurality of pumps, gear shift valves, associated pilot valves, a pressure control valve, a conditioning valve, and a pressure step controller, such elements being connected by suitable ducts indicated by connecting lines, Fig. 1a is a sectional view of the pressure step controller, the section being taken along the line 1a—1a of Fig. 1, Fig. 2 is an elevation of the transmission partly in section, such section being taken along the line 2—2 of Fig. 4, Fig. 3 is a partial sectional view, such section being taken along the line 3—3 of Fig. 4, Fig. 4 is a sectional view, the section being taken along the line 4—4 of Fig. 2, Fig. 5 is a sectional view of a casing enclosing various valves of the control system, the section being taken along the line 5—5 of Fig. 6, Fig. 6 is a sectional view of the casing shown in Fig. 5, the section being taken along the line 6—6 thereof, Figs. 7, 8 and 9 show another casing enclosing a pair of pumps and valves and carrying a pressure step controller, Fig. 7 being a sectional view, the section being taken along the line 7—7 of Fig. 8, Fig. 8 being a sectional view, the section being taken along the line 8—8 of Fig. 7, and Fig. 9 being a sectional view, the section being taken along the line 9—9 of Fig. 7.

The transmission shown in Figs. 2, 3 and 4 provided with the control system comprises a first housing section 200 enclosing a hydrodynamic clutch 203 and provided with a flange adapted to be connected to an internal combustion engine and a second housing section 201 encasing a plurality of gearings adapted to be set to various ratios of transmission by engagement and disengagement of clutches to be described hereinafter.

The housing sections 200, 201 are connected to one another by peripheral bolts not shown. The driving members 300 which may be the end flange of the crankshaft of an internal combustion engine is fastened to the primary section 202 of the hydrodynamic clutch 203. The primary section of the clutch is provided with a cover 204 having a hub 205, the parts 202, 204 and 205 being firmly fixed to each other. The hub 205 is journalled in a partition wall 206 of housing section 200 by a ball bearing 301.

A hollow shaft 207 extends coaxially through the hub 205 and through an opening in an end wall 212 of the housing section 201 and is journalled in such opening by a ball bearing 211. Moreover, the hollow bearing is journalled in the hub 205 by a needle bearing 302 and carries the secondary section 208 of the hydrodynamic clutch being firmly connected therewith. The hydrodynamic clutch is of a well known type in which the primary section and the secondary section confine an annular chamber between them and are provided with vanes extending through such chamber. The chamber is filled with a suitable liquid, such as oil. Upon rotation of the primary section 202, the vanes thereof impart a circulatory motion to the liquid causing same to act on the vanes of the secondary section 208 whereby the driving torque is transferred to the same.

A driven shaft composed of two splined coaxial sections 209 and 227 is disposed in coaxial relationship to the hollow shaft 207, the shaft section 209 extending within the hollow shaft 207 and therethrough so as to be adapted to be clutched to the driving member 300 by a multi-disk friction clutch 210 which is normally in disengaged condition but may be engaged by a hydraulic ram in form of an annular piston 303. This piston is normally held by a helical spring 304 in retracted position as shown. By the admission of fluid under pressure through longitudinal ducts 240 provided in shaft 209 and through radial bores thereof into a space provided between piston 303 and an adjacent end wall 305 of the secondary clutch member 208, the piston 303 may be urged to the left thereby compressing spring 304 and engaging the multi-disk friction clutch 210 for direct transmission of driving power from the driving member 300 to the driven shaft 209, 227, the latter being the outgoing shaft geared to the driven wheels of the vehicle through a suitable rear axle transmission.

The end wall 212 and the partition 206 confine a chamber 213 for the accommodation of the elements of the hydraulic control system to be described later. A secondary shaft 216 extends parallel to the driven shaft 209, 227 being journalled in the end wall 212 and in another end wall 224 of the housing section 201 by means of anti-friction bearings, such as 217. The secondary shaft 216 is permanently geared to the hollow shaft 207 and is thus adapted to be driven through the hydrodynamic clutch. To this end, a gear 215 is fixed to the secondary shaft 216 and meshes with a gear 214 integral with shaft 207.

A plurality of sets of gears are provided whereby the secondary shaft may be geared to the driven shaft 209, 227 at any one of a plurality of different ratios of transmission. To this end, shaft 227 is formed with a pair of gears 218 and 219 and carries a third gear 228 rotatably journalled thereon. A gear 220 which is in permanent mesh with gear 218 is journalled on the hub of gear 215. Similarly, a gear 221 journalled on shaft 216 is in permanent mesh with gear 219.

The gears 220 and 221 may be selectively clutched to the secondary shaft 216. For this purpose, a drum-shaped housing 230, Figs. 2 and 3, is fixed to the secondary shaft 216 and constitutes a cylinder in which a pair of fluid-operable rams 222 and 223 is movably mounted and is normally held by springs, such as 306, in engagement with a central transverse partition 307 of drum 230. The spaces between such partitions and the rams 222, 223, however, may be supplied with a fluid under pressure through longitudinal conduits 237 and 238 of shaft 216 and through radial bores shown at 308 and 309. When that happens, the respective ram 222 or 223 will be urged outwardly and will compress the disks of a multi-disk clutch, such as 310, whereby the respective gear 220 or 221 will be clutched to shaft 216.

The secondary shaft 216 is formed with a gear 226 which is in permanent mesh with both the gear 228 and a gear 232 fixed to a reverse shaft 229, Fig. 3, which extends parallel to shaft 216 and is suitably journalled in the transmission housing. The gear 228 is connected to shaft 227 by a one-way clutch which may be rendered effective or ineffective by engagement or disengagement of a toothed clutch. The teeth of one member of such clutch are shown at 311. The teeth 311 are formed on a rotary member which is journalled on shaft 227 and forms part of the one-way clutch above referred to. The other section of the toothed clutch is mounted for axial displacement by fluid pressure in non-rotary relationship within a member fixed to shaft 227. To this end, a hydraulic ram I is diagrammatically indicated in Fig. 1.

The transmission is set to the first, i.e. lowest, speed ratio by energization of ram I and by disengagement of the friction clutches 210 and 310, motion being transmitted from driving member 300 through the hydrodynamic clutch 202, 208, through the elements 207, 214, 215, 216, 226, 228, 311 to outgoing shaft 227 through the one-way clutch connecting gear 228 and shaft 227.

The transmission is set to the second speed ratio by actuation of ram 222 whereby gear 220 is clutched to the secondary shaft 216, power being transmitted via the elements 300, 202, 208, 207, 214, 215, 216, 220 and 218 to the outgoing shaft 227. In this operation, the one-way clutch associated with gear 228 permits the latter to be overtaken by shaft 227.

The transmission is set to the third speed ratio by actuation of ram 223 engaging the clutch associated with gear 221 and by disengaging the clutches 210 and 310, motion being transmitted from the driving member 300 via the hydrodynamic clutch 202, 208, shaft 207, gears 214 and 215, gears 221 and 218 to the outgoing shaft 227.

The fourth or direct speed ratio is set up by engagement of clutch 210, the clutches in drum 230 being both disengaged. With this set-up motion is directly transmitted from member 300 through clutch 210 to the outgoing shaft 209, 227, while the driven section 208 of the hydrodynamic clutch, the hollow shaft 207, gears 214 and 215 and the secondary shaft 216 are idling.

For a more detailed description of the mechanical details of the transmission reference may be had to my co-pending application Serial No. 245,131, filed September 5, 1951, for "Speed Change Transmission for Motor Vehicles," now Patent No. 2,756,616, dated July 31, 1956.

The control system which controls the hydraulic rams 303, 222 and 223 and the ram I for the engagement or disengagement of the toothed clutch having the teeth 311 comprises three pumps P, P1 and P2 diagrammatically shown in Fig. 1, a plurality of valves likewise shown in that figure, and a pressure step controller which controls a pressure produced by the pump P in dependence on the speed of the outgoing shaft.

The three pumps are gear pumps, the pump P1 (Figure 2) being composed of an internal gear 312 which surrounds and meshes with a gear 315 and is rotatably mounted in a cover 313 which surrounds the hub 205 and is suitably fixed to a plate-shaped casing 233 which is disposed within the chamber 213 and is fixed to the partition wall 212 by a plurality of screws, such as 314 (Figure 4). This casing 233 is provided with a plurality of parallel horizontal bores accommodating the majority of the valves above referred to as will be described later. The gear 315 is fixed to the hub 205 and, therefore, is driven by the driving member 300 through the intermediary of the elements 202, 204 and 205. The crescent-shaped space between the gears 312 and 315 is filled by a stationary member 316 which is fixed to the casing 233. A suction conduit 317, Fig. 1, and a pressure conduit 318 coordinated to the pump P1 are provided by suitable ducts constituted by bores within the casing 233. Through such ducts the pump P1 will suck oil from the sump provided at the bottom of space 213 and will feed such oil into the pressure line 318, the quantity of oil so fed per time unit depending on the speed of the engine of the vehicle. The two other pumps P and P2 are mounted on a second casing 234, Figs. 4 and 9, which is likewise disposed within the chamber 213 and fixed to the partition wall formed by the end wall 212 of casing section 201, each pump comprising a driving gear 319, and 320 respectively, splined to a common shaft 254, Fig. 9, which is rotatably mounted in super-imposed cover plates 321 bolted to each other and to casing 234, the shaft 254 being connected to the reverse shaft 229 of the transmission by suitable means to be described later, whereby the pumps P and P2 are geared to the driven shaft 209, 227 of the transmission and will thus feed a quantity of oil per time unit which is proportional to the speed of travel of the vehicle.

In Fig. 1 I have diagrammatically indicated at I the ram for the engagement of the toothed clutch having the teeth 311, at II ram 222, at III ram 223, and at IV ram 303. Since at any time gear 228 can be overtaken by the outgoing shaft when the latter is driven through one of the other gear clutches II, III, IV, the toothed clutch operable by ram I may be kept in engaged condition as long as the vehicle is travelling forward at any speed. Ram II must be de-energized, however, when the transmission is to be shifted into reverse.

Some of the elements to be described hereinafter form the subject matter of my co-pending application Serial No. 320,032, filed November 12, 1952. For the purpose of the present disclosure reference may be had to such co-pending application and the disclosure thereof is to be considered part of the present disclosure.

At the bottom of Fig. 1 I have diagrammatically illustrated the various possible positions to which a hand lever may be set for conditioning the control system, a slotted guiding member being employed to guide such hand lever, said guiding member having two guideways 10 and 11 connected by a transverse guideway 12. The guideway 10 determines the setting positions for conditioning the system to "Normal," "Braking I," "Braking II," "Idling" and "Synchronizing," whereas the second guideway determines the positions of the hand lever for conditioning the control system to "Reverse" and "Parking." Preferably, means are provided to temporarily brake and stop the driven member of the hydrodynamic clutch whenever the lever passes through the position "Synchronizing." The aforementioned positions are indicated in Fig. 1 by the leters N, BI, BII, I, S, Re and Pa.

In Fig. 1 a lever 16 is shown diagrammatically which is operable by the hand lever heretofore referred to and may be moved by the same to any one of the five positions N, BI, BII, I and S.

The lever 16 is provided with a yoke straddling a peripheral groove provided in the head 322 of the stem of the conditioning slide valve Q2 which thus may be moved to any one of five positions, the position shown being the right hand end position "Normal" in Fig. 1.

The conditioning slide valve Q2 is shown in Fig. 5 in its left hand end position "Synchronizing." Its purpose is to control pilot valves K2 and K3 and gear shift valves S2, S3 and S4.

The fluid is fed by pump P, as shown in Figure 1, through conduit 14 and a branch conduit 15 to a spring-loaded relief valve U and is further fed from conduit 14 through a conduit 71 to the conditioning valve Q2 and thence to the pilot valves. The relief valve U comprises a valve member 17 which is slidably guided in a cylindrical bore of casing 234, Figs. 1 and 8, such bore being provided with a plurality of discharge ports 20, 21 and 22. The valve member 17 is urged to the initial position shown in Figs. 1 and 8 by a helical spring 18 and in this position abuts a plate 245 (Figure 8) inserted between casing 234 and the pump covers 321.

A stop plate 323 is provided within the path of the relief valve member 17 being spaced therefrom when said relief valve member 17 is in its starting position. This stop plate is movably guided and loaded by a helical spring 18'. When the pressure in line 15 has displaced valve member 17 so as to uncover the ports 20 and 21 compressing spring 18 it will abut stop 323 and on a further rise of pressure in line 15 will move plate 323 and compress both springs 18 and 18' until the discharge port 22 will have been uncovered to thereby prevent a further increase of the pressure in line 15.

The relief valve U cooperates with the rotary pressure step controller R to adjust the pressure in line 15 in dependence on the speed of the outgoing shaft. The pressure step controller comprises a shaft 248 provided with four lengthwise grooves 39, 40, 41 and 42, Fig. 1a, and surrounded by a sleeve 241 (Figure 9) which is rigidly connected with the shaft 248 and is rotatably journalled in a bushing 242 which, in its turn, is fitted in an extension 236 of casing 234. This extension 236 projects through an opening 235 provided in a partition 212 of the transmission housing. The sleeve 241 extends out of the bushing 242 and is integral with a head 325 having four radial bores 51', 52', 53' and 54', Fig. 1a. Each bore communicates with the associated one of the grooves 39 to 42 through holes 326, Fig. 9, and is closed on the outside by a cup-shaped cover 327 which is provided with an outlet 51, 52, 53, or 54 respectively. These outlets may have different cross sections. Within the bores 51', 52', 53', 54' pistons 47', 48', 49' and 50' are slidably mounted which are provided with longitudinal grooves establishing a communication between the hole 326 and the outlet 51, 52, 53, or 54 respectively. Each of the pistons carries a spherical valve member 47", 48", 49", or 50" respectively, which in the outer position of the piston seats on the edge of the outlet 51, 52, 53, or 54 respectively, thereby closing the same. However, the pistons are normally urged inwardly by helical springs 56' inserted between the cover plate 327 fixed to the head 325 and a shoulder of the piston. Under the effect of the centrifugal force the pistons may be hurled outwardly into closing position compressing the surrounding helical spring. The various pistons have different weights, and, therefore, will respond to different rotary speeds of the rotary pressure step controller R.

The inner end of shaft 248 is provided with clutch teeth 251 engaging clutch teeth 252 of shaft 254. The outer end of shaft 248 is provided with a polygonal recess 249 which slips into engagement with a polygonal head 250 of a reverse shaft 229, when during assembly of the transmission the casing 234 is put in place by inserting the extension 236 through opening 235, the pressure step controller R being supported in the opening 235 of the partition 212 by means of bushing 242. As a result, shaft 248 of the pressure step controller and the gear pumps P and P2 are clutched to reverse shaft 229 to be driven at a speed proportional to the speed of travel of the vehicle.

Four peripheral grooves 35, 36, 37 and 38 are provided in the sleeve 241, and each of such peripheral grooves communicates through a radial bore, such as 330, with an associated one of the four longitudinal grooves 39, 40, 41 and 42 and with the associated cylinder 51', 52', 53', or 54'. A duct 29 (Figure 1) connects peripheral groove 36 with port 20; a duct 24 connects peripheral groove 38 with port 21; and a duct 19 connects pressure duct 15 with the peripheral groove 35.

A cylindrical valve member Q1 (Figures 1 and 8) which constitutes a supplemental conditioning valve is slidably mounted in a bore 23 of casing 234 and is normally held in contact with plate 245 by a helical pressure spring 331 as shown in Figure 8. The bore 23 has three ports 30, 31 and 32 controlled by the supplemental conditioning valve Q1. For that purpose, the valve member thereof has a peripheral groove 28 which in the normal position of Fig. 8 registers with ports 30, 31 thereby connecting the same. The casing 234 is so cut away at the bore 23 as to expose the left end of the supplemental conditioning valve Q1 with reference to Fig. 8. A bell crank 280 diagrammatically indicated in Fig. 1 and more fully shown in Fig. 5 is fulcrumed in a bracket 332 fixed to casing 233. One arm of bell crank 280 is mounted in the path of a collar 333 of conditioning valve Q2, while the other arm of bell crank 280 may engage the exposed end of supplemental conditioning valve Q1 and displace the same towards the right. This happens when lever 16 is rocked to the positions BI or BII. As a result, positioning of lever 16 to the position "Normal" causes the supplemental conditioning valve to seal ports 30 and 31. Positioning of lever 16 to BI causes supplemental conditioning valve Q1 to connect ports 31 and 32, and positioning of lever 16 to BII causes supplemental conditioning valve Q1 to move to the end position shown in Fig. 8 in which the ports 30 and 31 will communicate.

Port 30 is connected to pressure duct 19; port 31 is connected to a branch of duct 29; and port 32 is connected by a duct 334 to the peripheral groove 37.

When the supplemental conditioning valve Q1 has been set to "Normal" as shown in Fig. 1, the pressure produced by the pump P in lines 14, 15 and 71 is zero for the lowest range of rotary speeds of the outgoing shaft 227 to which pump P is geared until a speed V1 will have been reached. At that speed, the centrifugal force acting on piston 47' will overcome spring 56' and will move piston 47' outwardly causing it to move spherical valve member 47" to closing position. As a result, the flow of oil through duct 19, peripheral groove 35, longitudinal groove 39, cylinder 51' and outlet 51 will be blocked and pressure will be built up by pump P in lines 14, 15, 19 and 71 displacing relief valve 17 until port 20 will be uncovered permitting the surplus oil to escape through duct 29, peripheral groove 36, longitudinal groove 40, cylinder 52' and outlet 52, while the spring 18 will so throttle the escaping oil as to maintain a constant pressure $p1$ in lines 14, 15 and 71.

When the speed V2 will have been reached, piston 48' will seal outlet 52 thus blocking the discharge of liquid through port 20. As a result, relief valve 17 will be further displaced compressing spring 18, the pressure in lines 14, 15 and 71 being further raised to the value $p2$ until port 21 will be uncovered permitting the surplus liquid to escape through duct 24, peripheral groove 38, longitudinal groove 42, cylinder 54' and outlet 54.

When speed V3 will have been reached, outlet 54 will be closed thus blocking the escape of liquid through port 21 causing relief valve 17 to be further displaced until it engages the stop plate 323, Fig. 8, compressing both springs 18 and 18'. As a result, the pressure in lines 14, 15 and 71 will be considerably raised to a level $p3$ causing relief valve 17 to uncover the discharge port 22.

From the foregoing it will appear that when lever 16 is set to "Normal" the pressure step controller R will function to adjust the pressure in lines 14, 15 and 71 to three different levels corresponding to the speeds V1, V2 and V3.

When lever 16 and the conditioning valves controlled thereby are set to the position BI in which ports 31 and 32 are put in communication, the sealing of outlet 52 does not block the escape of oil through port 20, because the latter does not only communicate with outlet 52 but at the same time through ports 31 and 32, duct 334, peripheral groove 37, longitudinal groove 41 and cylinder 53' with outlet 53. This outlet, however, will not be closed until the speed has reached a higher speed V2x. The speed limit for the pressure $p2$ controlled by piston 50' will not be varied.

When the conditioning valves Q1 and Q2 are set to the position BII as shown in Fig. 8, the ports 30 and 31 will communicate. In this event, no pressure at all will be built up in lines 14, 15 and 71 until the speed V2 is reached in which port 52 is closed, since up to that instant the oil may freely escape from pump P via ducts 14, 15 and 19, port 30, recess 28 of valve Q1, port 31, duct 29, peripheral groove 38, longitudinal groove 40, cylinder 52' and outlet 52. When both outlets 51 and 52 have been closed to prevent the escape of oil through duct 19 in the manner described, the pressure $p2$ will be built up causing relief valve 17 to uncover port 21. The speed limit for pressure $p2$ will not be varied.

Both of the pumps P1 and P2 are placed in shunt feeding the liquid from suction line 317, or 335 respectively, to pressure line 107 (Figure 8). Check valves, however, are interposed between pressure line 107 and the pumps P1 and P2, one check valve being formed by a poppet valve 104' and the other one by a poppet valve 105' which are preferably mounted in coaxial relationship to be slidable on a common pin 336 and are actuated by a common helical spring 106 urging the valves on opposed valve seats. The maximum pressure that can be produced by pump P1 geared to the engine when the engine is racing is limited by the pressure control valve T. The pressure line 107 communicates through ducts 125', 120, 125 and 121 with an end space 122 of the bore accommodating the pressure control valve T. Therefore, pressure produced by pump P1 in line 107 tends to shift pressure control valve T to the right contrary to the tendency of spring 98'. When such displacement exceeds a certain limit, the pressure control valve T uncovers a discharge port 287 placing the same in communication with an annular groove 286 of the bore in which valve T is slidable. The groove 286, however, communicates through duct 285 with the pressure line 318 of pump P1. Therefore, when the pressure in the end space 122 exceeds a certain limit, pump P1 is placed on exhaust thereby preventing a further increase of pressure.

The conditioning valve Q2 is provided with three spaced piston sections 60, 61 and 65 slidably guided within a bore of the valve casing 233. The piston sections 60 and 61 cooperate with internal grooves 68, 69 and 70 which are provided within the bore and are so spaced as to be positioned between the piston sections 60 and 61 when the valve Q2 is set to "Normal" as shown in Fig. 1. The groove 68 communicates via ducts 71 and 72 with the pressure line 14 of the pump, whereas the grooves 69 and 70 are individually connected to ducts 73 and 74 leading to valves K3 and S4. There are provided two pilot valves K2 and K3 and three gear shift valves S2, S3 and S4. The gear shift valve S4 performs the additional function as a pilot valve. The valves K2 and S2 control the actuation of the ram II for the setting of the transmission to the second speed ratio. The valves K3 and S3 control the actuation of the ram III for the setting of the transmission to the third speed ratio. The valve S4 controls the actuation of the ram IV for the setting of the transmission to the fourth speed ratio.

Moreover, the valve housing includes the pressure controller T which controls the pressure fluid supplied from the pump P1 or P2 to the gear shift valves S2, S3 and S4 in the manner disclosed in my co-pending application Serial No. 320,032, now Patent No. 2,833,162 dated May 6, 1958.

Each of the pilot valves K2 and K3 and the combined pilot and gear shift valve S4 constitutes a differential piston formed by a piston section of smaller diameter and a piston section of larger diameter. Thus, the pilot valve K2 comprises the piston sections 75 and 76 connected in spaced relationship by a valve stem. Pilot valve K3 comprises the spaced piston sections 77 and 78. The combined pilot and gear shift valve S4 comprises the spaced piston sections 79 and 80. Each of the valves K2 and K3 is urged towards an end position by a spring 81 or 82 respectively, accommodated in the cylinder bore 83, or 84 respectively, in which the pilot valve piston section of smaller diameter is guided. The end of the cylinder bore 83 is connected by a pipe 85 with the pressure pipe 71 of pump P via groove 68 of conditioning valve Q2 and conduit 72, the pressure therein being controlled by the pressure step controller R. The cylinder bore 84 accommodating section 77 of smaller diameter of pilot valve K3 is connected by line 73 to groove 69 controlled by conditioning valve Q2. The cylinder bore 86 accommodating piston section 79 of the valve S4 communicates by a pipe 74 with the groove 70 controlled by valve Q2. The valve S4 is urged towards the end position shown in Fig. 1 by a spring 87 inserted in the cylinder bore 128 of larger diameter.

The spring 81 is biassed to a higher degree than spring 82. Therefore, valve K3 is urged towards the end position with a smaller force than is valve member K2.

The pressure control valve T is positioned contrary to fluid pressure in space 122 by push rods 94' and 94", Fig. 4, and has piston sections 88, 89, 90, 91 and 92 and is urged by a spring 98' towards the left, such spring being inserted between a collar 339 on push rod 94' and a collar 99' which is guided for axial displacement and is adapted to be shifted by a lever 338 fulcrumed on the partition 212 and adapted to be rocked in anti-clockwise direction with reference to Figs. 1 and 4 by the accelerator pedal 100 when the same is kicked down beyond its full power position.

The push rod 94" engages a diaphragm 95 within a housing 340 which is mounted on the outside of housing section 200 of the transmission. The housing 340 is provided with a chamber 96 which communicates by a pipe 97 with the intake manifold of the engine and is sealed by the diaphragm 95. Moreover, the housing 340 encases a pressure spring 93' exerting pressure upon the diaphragm. Since the vacuum prevailing in the intake manifold and in chamber 96 is substantially inversely proportional to the driving torque exerted by the engine of the driving member 300, and the spring 93' and the diaphragm 95 will exert on pressure control valve T a combined force which increases as the driving torque increases, and the driver may additionally increase such force by kicking down the accelerator pedal 100 whereby the spring 98' will be biassed.

Each of the piston sections 89, 90, 91 and 92 is adapted to control the communication of lines 129, 130, 131 and 132 with supply lines 112 and 123 in such a manner that continuous movement of valve member T to the left will successively cut off lines 132, 131, 130 and 129 in the manner described in my co-pending application Serial No. 320,032.

The pressure line 107 of the two pumps P1 and P2, one of which is geared to the driving member 300 and the other one of which is geared to the driven shaft 227 of the transmission, is connected by ducts 125', 120 and 109 to a peripheral groove 110 controlled by conditioning valve Q2. When the valve Q2 is in the position shown in Fig. 1, the groove 110 communicates with a groove 111 connected to a duct 112. Duct 112 leads to the internal grooves 114 and 115 of the bore accommodating pressure controller T. The line 120 is connected between ducts 125 and 125'. Line 125 communicates with a groove 118 adapted to be controlled by piston section 76 of pilot valve K2. Pipe 125' leads to a control groove 119 adapted to be controlled by piston section 78 of valve K3. Moreover, branch line 120 connects line 125' with the pressure controller T over a branch 121 leading to the end space 122 of the cylindrical bore thereof, whereas a branch line 123 leads from line 125' to an internal groove 124 of pressure controller T. Communication of the latter with line 132 is controlled by piston section 92 of valve T. The end space 128 of gear shift valve S4 and the end space 127 of pilot valve K3 communicate with pressure line 107 through ducts 125', 190, and through ducts 125', 120 and 125 respectively.

The outgoing line 129 controlled by the pressure controller T has a branch 133 leading to an internal groove 134 of the valve housing controlled by cylinder section 80 of valve S4. Another branch line 135 leads to the ram I adapted to actuate the toothed clutch rendering the first gear effective. If ram I is actuated while each of the rams II, III and IV is de-energized i.e., while the latter are put on exhaust, the transmission is set to the first speed ratio. The pipe 130 controlled by the pressure controller T leads to an internal groove 152 of the bore accommodating valve member S2. The pipe 131 controlled by the pressure controller T leads to an internal groove 155 of the bore accommodating valve member S3. Line 132 likewise controlled by pressure controller T communicates through a line 191 with the lubricating point or points marked by the circle denoted at Sch' and Sch", and by line 136 with the hydrodynamic clutch marked by the circle denoted at Hy.

The gear shift valve S2 comprises two valve members slidably guided in a cylindrical bore of the valve casing, one of said valve members being formed by two cylindrical sections 144 and 145 connected in spaced relationship by a valve stem 143, and the other valve member comprising a cup-shaped valve member 146 having an external groove 169 communicating with the inner space 170 by radial bores and, in its turn, accommodating a helical pressure spring 147 tending to move valve member 146 to the left. A helical spring 148 surrounds stem 143 and tends to urge the two valve members apart. The two valve members control a plurality of ports which will be described later with reference to the operation of the control system.

The gear shift valve S3 comprises a valve member slidably guided in a cylindrical bore of the valve casing and formed by two piston sections 149 and 150 connected in spaced relationship by a stem and adapted to control the alternative communication of an internal groove 156 with one or the other of two internal grooves 155 and 163. A spring 151 inserted in the end space 167 of the internal bore tends to keep the valve member in its left end position shown in Fig. 1, while the two grooves 156 and 163 are put into mutual communication.

The line 130 controlled by the pressure controller T leads to an internal groove 152 of gear shift valve S2. When the latter is in the position shown, such groove communicates with a groove 153 which is connected with a line 154 leading to the ram II which if actuated by fluid pressure sets the transmission to the second speed ratio.

The line 131 controlled by the pressure controller T is connected to the internal groove 155 of valve S3, whereas the groove 156 of the latter is connected by a line 157 with the ram III which when fed by fluid under pressure will set the transmission to the third speed ratio.

The pilot and gear shift valve S4 controls the alternative communication of a port 158 connected by line 159 to ram IV either with an internal groove 185 connected to exhaust O, as shown in Fig. 1, or with the internal groove 134 which, as stated heretofore, is supplied with fluid under pressure controlled by pressure controller T via lines 129 and 133. The ram IV when actuated by fluid under pressure will set the transmission to its fourth speed ratio.

Suitable means are provided which ensure that coincidentally to the actuation of ram III, ram II will be put on exhaust. To this end, the internal groove 156 controlled by valve S3 is conected by a duct 157 and 164 with the space 165 of the bore accommodating valve S2. Similarly means are provided to ensure inactivation of ram III upon actuation of ram IV. For that purpose, line 159 supplying ram IV has a branch line 166 leading to the end space 167 of the bore accommodating valve S3, a branch line 168 connecting line 166 with a port communicating with the external groove 169 of valve member 146 of valve S2. Fluid pressure supplied to ram IV will thus obtain access through lines 166 and 168, groove 169 and radial bores to the interior space 147 of cup-shaped valve member 146 shifting the same to the left.

From a port communicating with the space 172 between piston sections 75 and 76 of pilot valve K2, a duct 171 leads to the end space 173 of the bore accommodating gear shift valve S2. Similarly, a port communicating with the space 175 between piston sections 77 and 78 of pilot valve K3 is connected by a duct 174 with an internal groove 176 of the bore accommodating valve S2, said groove 176 being spaced from the port of line 168 a distance less than the width of the external groove 169. A branch duct 177 leads from line 174 to the left end space 178 of the bore accommodating valve S3. An internal groove 180 of the bore accommodating conditioning valve Q2 which may communicate with the end of such bore being thus put on exhaust, is connected by a duct 324 to an internal groove 194 of the same bore.

The operation of the control system is as follows:

Let us assume that the control lever (not shown) mounted on the steering column and operatively connected with lever 16 is set to its "Idling" position thereby conditioning valve Q2 one step to the right from the position shown in Fig. 5. In this position of the conditioning valve Q2 groove 180 is put on exhaust. Therefore, line 112 is put on exhaust via groove 111, groove 194, duct 324 and groove 180. Since each of the rams I, II, III and IV can be supplied with fluid under pressure from line 112 only, as will be later described, the rams are de-energized no matter what the position of the gear shift valves S2, S3 and S4 may be.

When the driver wishes to start the vehicle he must shift the control lever (not shown) mounted on the steering column to the position "Normal" thereby moving lever 16 to the position "Normal" shown in Fig. 1 bringing the conditioning valve Q2 to the position shown in Fig. 1, Fluid fed by the primary pump P1 is fed via line 318 to the valve V lifting valve member 104′ from its seat while keeping valve member 105′ on its seat as long as the vehicle is driving at so slow a speed that the pressure produced by the secondary pump P2 is insufficient to overcome the pressure of spring 106. From valve V the pressure fluid is fed through line 107, line 125′, line 109, groove 110, groove 111, lines 112 and 114 to the pressure controller T whence the pressure oil is admitted to the lines 129, 130 and 131. Moreover, the pressure oil is admitted from lines 125′ and 120 through line 113, groove 118 and port 172 of the pilot valve K2 and through duct 171 to the pressure space 173 of the gear shift valve S2, whereby valve S2 is shifted to the position shown in Fig. 1. As a result, the gear shift valve S2 admits pressure fluid from line 130 via grooves 152 and 153 and line 154 to ram II setting the transmission to the second speed ratio. As soon as the vehicle attains a certain speed causing pump P2 to produce sufficient pressure to lift valve member 105′ from its seat, the control system will now be supplied with pressure fluid from the secondary pump. As soon as the pressure supplied to the end space 122 of pressure control valve T via ducts 107, 125′, 120, 125, 121 exceeds a certain limit, the pump P1 will be short-circuited via ducts 318, 285, groove 286 and groove 287 which is put on discharge. As a result, valve member 104′ will be seated, duct 107 being supplied with oil under pressure by pump P2 only.

While the line 112 connected to groove 111 and the ducts and valve spaces communicating therewith are controlled by the conditioning valve Q2, the lines 120, 123, 113 and 116 communicating with the duct 107 are independent of the conditioning valve Q2. The pressure controller T is subjected to the pressure in the associated end space 122 connected to lines 121 and 120 which are thus independent of the setting of lever 16. Similarly, the supply of oil under pressure to the hydrodynamic clutch through lines 123, 132, 191, 136 and 137′ and the supply of lubricating oil through line 191 are independent of the setting of lever 16.

The pilot valves K2 and K3 are subject to the pressure controlled by the pressure step controller R and are thereby enabled to respond to an increase of the vehicle speed beyond the speed limits V1, V2 and V3 as described hereinabove.

The pressure controller T, which as stated above is acted upon by the pressure in space 122, is subject to the pressure of spring 93′, to an additional pressure exerted by the diaphragm 95 and to the pressure of spring 98′ produced when the accelerator pedal 100 is kicked down beyond its full gas position in which the throttle is fully opened. The pressure exerted by the diaphragm depends on the vacuum in the intake manifold of the engine communicating through pipe 97 with the diaphragm chamber. The dependence on the vacuum of the engine has the effect that piston section 92 will throttle the flow of fluid from pipe 123 to pipe 132 more or less thus maintaining in lines 123, 107, 125′, 120, 125, 189 and 116 a pressure substantially corresponding to the torque produced by the engine. In this manner, the pilot valves K2, K3 and S4 are controlled in dependence on the torque produced by the engine thus being able to determine the shifting-up diagram of the control system and, at the same time, the pressure produced in the friction clutches of the transmission by the rams.

A continuous displacement of the valve member of pressure controller T to the right will successively open lines 130, 131, 129, and 132, line 130 supplying ram II, line 131 supplying ram III, line 129 supplying rams I and IV, and line 132 supplying oil for the lubrication points Sch and for the hydrodynamic clutch Hy. For a detailed explanation of the function of the pressure controller reference may be had to my copending application Serial No. 320,032.

The maximum pressure supplied to the rams is controlled by valve A′, since this pressure acts via ducts 107, 125′, 120 and 125 in the end space 281 on the valve member A′. When the pressure rises above a certain limit compressing spring 283, the groove 284 put on exhaust will be uncovered and put in communication with the end space 281 to relieve the system of excessive pressure.

The pressure spaces 126, 127 and 128 and the pilot valves K2, K3 and S4 are supplied by the primary pump P1 or the secondary pump P2, whereby the pressure space 127 is supplied via lines 107, 125′, and 190, the pressure space 128 via the branch lines 120 and 125, while the pressure space 126 of the control valve K2 is supplied by the aforementioned pumps via branch line 109 branching off line 120, control grooves 110 and 111 of the conditioning valve Q2, the line 112, the control groove 115 of the pressure controller T and the lines 129 and 133. The functioning of the pilot valves K3 and S4 is, therefore, independent of the adjustment of the conditioning valve Q2. The pressure spaces 83, 84 and 86 of the valves K2, K3 and S4 are supplied with fluid under pressure controlled by the pressure step controller R, such pressure thus depending on the speed of the vehicle.

The springs 81, 82 and 87 of the pilot valves are so dimensioned and biased as mentioned hereinabove that when the fluid pressure amounts to $p1$ it holds pilot valve K2 in its operated position as shown in Figs. 1 and 5 thereby causing fluid pressure to be supplied to ram II in the manner to be described hereinafter, irrespective of the pressure maintained by pressure controller T in space 126 as long as accelerator pedal 100 is not kicked down. The pilot valve K2 in its operated position establishes a communication from valve V via lines 107, 125′, 120 and 116, groove 118 controlled by pilot valve K2, space 172 of the latter, line 171, and end space 173 whereby gear shift valve S2 is urged to the position shown in Fig. 1. This valve establishes a communication from groove 111 via line 112, groove 114, groove 182, duct 130, groove 152 of gear shift valve S2, groove 153 of the latter, and line 154 to ram II.

When the speed of the vehicle increases beyond speed V1, the pressure step controller R raises the pressure in line 71 to $p2$ in the manner described. As a result, pilot valve K2 will be maintained in the position shown in Fig. 1 by fluid under pressure admitted to end space 83 from duct 71 through groove 68 of conditioning valve Q2 and duct 85, even if the pressure in space 126 is increased by the driver kicking down accelerator pedal 100.

Should the pressure maintained in lines 125′ and 190 and in space 127 of pilot valve K3 by the pressure controller T in dependence on the intake vacuum drop below a certain value, or should the speed of the vehicle exceed the limit V2, the pilot valve K3 will be shifted to the right under the combined effect of spring 82 and of the fluid pressure set up by the pressure step controller R in space 84 via line 71, groove 69 of conditioning valve Q2 and line 73. However, by kicking down the accelerator pedal 100 beyond its full power position, the driver may increase the throttling effect of piston section 92 and may thereby raise the pressure prevailing in lines 123, 125 and 190 and in space 126 to such an extent as to cause displacement of pilot valve K2 to the right, provided that the vehicle speed does not exceed the limit V1. Movement of pilot valve K2 to the right causes the relief of ram II from pressure in the manner described hereinafter, whereby the transmission will be operated at the first speed ratio, since ram I is being supplied with fluid under pressure via lines 129, 133 and 135, and since the gear clutched to the driving shaft by the toothed clutch actuated by ram I acts on the outgoing shaft of the transmission via a one-way clutch. Movement of pilot valve K2 to the right causes end space 173 of gear shift valve S2 to be put on exhaust via 171, 172, and a groove 183 connected to exhaust O. As a result, piston sections 144 and 145 of gear shift valve S2 are moved by spring 148 to the left putting ram II on exhaust via line 154, groove 153 and groove 162.

The following operations occur when the transmission is shifted from the second speed ratio to the third speed ratio: Shifting of the pilot valve K2 to its left hand end position shown in Fig. 1 establishes communication of the primary or secondary pump via lines 107, 125', 120, and 116, and grooves 118 and 172 with the line 171, whereby pressure is supplied to the end space 173 shifting gear shift valve S2 to the position shown in Fig. 1. The space 165 of gear shift valve S2 is put on exhaust via line 164, groove 156 of gear shift valve S3 and groove 163 of the same. End space 170 of gear shift valve S2 is likewise put on exhaust via groove 169, lines 168, 166 and 159, port 158 of valve S4, and groove 185 of the latter which is connected to exhaust O. Therefore, valve S2 is kept in its right hand position shown permitting pressure oil to be supplied from line 112 via groove 114 of the pressure controller T, line 130, grooves 152 and 153, and line 154 to ram II.

As stated heretofore, an increase of the speed of the vehicle beyond the limit V1 causes the ball 47'' of the pressure step controller R to increase the pressure to $p2$. If at that time the transmission had already been shifted to the second speed ratio, and if the power output of the transmission exceeds a certain limit, the pilot valve K2 assuming its left hand end position, the increase of the fluid pressure to $p2$ has the sole effect that the driver can no longer shift the transmission back to the first speed ratio by kicking down the accelerator pedal thereby increasing the pressure in space 126 beyond the normal maximum pressure.

At the same time, however, the pilot valve K3 is put into condition for operation to be ready to move to the right as soon as the vacuum-controlled pressure in the end space 127 drops below a certain limit. In that instant, the pilot valve K3 is shifted to the right whereby the pressure fluid having a pressure controlled by the pressure controller T is admitted via the pipes 107, 125' and 113, groove 119, space 175, line 174, and line 177 to the pressure space 178 of the gear shift valve S3 thereby shifting the same to the right. As a result, the fluid under pressure controlled by the pressure controller T will be admitted via line 131, groove 155, groove 156, and line 157 to the ram III thus setting the transmission to the third speed ratio. From groove 156 pressure fluid is admitted through line 164 into the space 165 of valve S2 thereby shifting the valve member provided with piston sections 144 and 145 to the left. That has the effect of putting ram II on exhaust in a manner described heretofore.

When duct 131 is opened by piston section 91 of the pressure controller T, the sudden admission of fluid under pressure to ram III causes a drop of pressure in end space 122 tending to move the pressure controller T to the left whereby the admission to line 131 is throttled to such an extent as to maintain in lines 121 and 120 the pressure determined by the intake vacuum of the engine. Line 130, however, is kept open, whereas line 129 supplying ram I and ram IV is temporarily closed by piston section 89. That has the effect of delaying the supply of fluid under pressure to ram I until after ram II has been supplied with pressure fluid. That in turn has the effect of synchronizing the toothed clutch elements actuated by ram I.

Maintenance of the pressure by the pressure controller T keeps the transmission set to the second speed ratio until a certain minimum pressure has been built up in ram III. Only after such minimum pressure has been reached and has been transferred via groove 156 and line 164 to space 165 of gear shift valve S2 will ram III be actuated and gear shift valve S2 restored to the left to thereby relieve ram II from pressure. The timed overlapping of the actuation of rams II and III ensures that the transfer of power through the transmission will not be interrupted.

It has been assumed hereinabove that the transmission is shifted to the third speed ratio by a drop of the power output. However, the same shifting operation of the transmission occurs when the speed of the vehicle exceeds a certain limit. In that event, the pressure prevailing in space 84 of pilot valve K3 will be increased by the pressure step controller R via 71, 68, 69, 73 to the amount $p3$ overcoming the pressure prevailing in space 127 thereby shifting the pilot valve K3 to the right causing gear shift valve S3 to be likewise shifted to the right, whereby pressure oil will be supplied to ram III in the manner described.

When the vehicle speed exceeds V3, the pressure prevailing in space 86 of pilot valve S4 is increased via lines 71 and 72, grooves 68, 69 and 70, and line 74 to the value $p4$, whereby the pilot valve S4 is shifted to the left. As a result, fluid under pressure controlled by the pressure controller T is admitted from line 129 via line 133, groove 134, port 158 and line 159 to ram IV setting the transmission to the fourth speed ratio. The same shifting operation may occur while the speed of the vehicle is between the limits V2 and V3 provided that the intake vacuum of the engine reduces the pressure prevailing in the end spac 128 of valve S4 to a certain amount.

Coincidentally to the actuation of ram IV fluid under pressure is supplied from line 159 via line 166 to pressure space 167 of valve S3 and through branch pipe 168 and groove 169 to pressure space 170 of valve S2. This has the effect of locking valve S2 in its left end position, as described in detail in my co-pending patent application Serial No. 320,032. Moreover, it has the effect of restoring valve S3 to the position shown as soon as sufficient pressure has been built up in ram IV to cause actuation thereof. Such pressure will shift gear shift valve S3 to the position shown contrary to the tendency of the pressure prevailing in space 178.

Once a pilot valve, such as valve S4, has been shifted to its operative left position, the pressure prevailing in the end space 128 is counteracted by the pressure prevailing between the two piston sections 79 and 80 and acting on the effective differential area of the two cross sections of 79 and 80. When the driver releases the accelerator pedal 100 closing the engine throttle more or less thus increasing the vacuum acting on diaphragm 95, the piston section 92 will reduce the pressure prevailing in lines 123, 125', 120 and 125 and in end space 127 of valve K3. Nevertheless, valve K3 will be maintained in the position shown. Also, a drop of the pressure prevailing in space 86 of pilot valve S4 to the amount $p3$ will not cause a restoration of the pilot valve S4, because the spring 87 is counteracted by the differential pressure between piston sections 79 and 80. In that respect, the function differs from that occurring in the shifting-up operation in which the pilot valve S4 remains in its right end position keeping the transmission shifted to the third speed ratio as the pressure step controller R maintains the pressure on the limit $p3$. Of course, the driver if he wishes may nevertheless shift the transmission from the fourth speed ratio to the third speed ratio while the vehicle speed is between the limits V2 and V3 by kicking down the accelerator pedal all the way, whereby spring 98' is given an additional bias increasing the throttling effect of piston section 92 and raising the pressure prevailing in lines 123 and 125 and in the end space 128 beyond the normal amount thus enforcing a restoration of pilot valve S4 in a manner similar to that described with reference to the shifting of the transmission from the second speed ratio to the first speed ratio. Similar considerations apply to the shifting from the third speed ratio to the second speed ratio.

Now the operation of the control system will be described when conditioned for the operation "Braking I," as may be desirable for driving in city traffic. With that adjustment, the groove 70 of the conditioning valve Q2 is disconnected from pressure pipe 72 and pump P and is put on exhaust via the discharge groove 194, duct 324 and groove 180. Therefore, the end space 86 of the pilot and gear shift valve S4 connected to the groove 70 by duct 74 can no longer be subjected to fluid pressure, and the valve S4 can no longer be moved to operated position but will keep ram IV deenergized.

Groove 20 controlled by the super-pressure valve U is now put by the supplemental conditioning valve Q1 into communication with the duct 32 and thus via groove and longitudinal duct 41 with the chamber 53' of the pressure step controller, whereas in the normal condition of valve Q2 the groove 20 was in communication with chamber 52'. The ball 49" seals the associated outlet 53 at a speed V2x which is higher than the speed V2. Therefore, with the control system conditioned for "Braking I," the pressure step controller will not raise the fluid pressure in lines 14 and 71 to the amount p3 until the higher speed limit V2x has been reached.

Hence, the transmission will be kept set to the second speed ratio up to a higher speed of the vehicle as is desirable for city traffic. Otherwise the function is the same as described for "Normal."

When the control system is conditioned for "Braking II" by suitable adjustment of lever 16 and conditioning valves Q1 and Q2, the groove 69 will be put on exhaust via groove 194, duct 324 and groove 180, and thereby the end space 84 of the pilot valve K3 will be relieved from pressure via duct 73 and the groove 69. As a result, the two rams III and IV will not be energized and the transmission can be set to either the first speed ratio or the second speed ratio only.

The valve Q1 establishes a communication between duct 19 and port 31 through port 30 and thereby via groove 36, and longitudinal duct 40 with chamber 52' in the pressure step controller R. As a result, the pressure prevailing in lines 14 and 71 will not be raised from p1 to p2 until the speed of the vehicle exceeds the limit V2 causing ball 48" to close the outlet 52. While the pressure may be raised beyond p2 by the pressure step controller when higher speeds are attained, such increase of the pressure will not have any effect, because the pilot valves K3 and S4 have been inactivated in the manner described.

It will be noted from Fig. 1 that the hydrodynamic clutch Hy is connected to a peripheral groove 341 of the bore accommodating valve A'. When the valve assumes the position shown in Fig. 1, groove 341 communicates with a groove 342 to which line 191 is connected by branch line 136. The right hand end space 282 is connected to line 159 and contains a spring 283. The annular groove 284 is put on exhaust. It had been stated hereinbefore that valve A' acts as a relief valve limiting the maximum pressure in the communicating ducts 107, 125', 120 and 125. When this pressure drops below a certain limit, for instance when the vehicle is at a stop and the engine is idling at a low speed, the spring 283 will shift valve member A' to the left thereby putting the hydrodynamic clutch on discharge via duct 137', groove 341 and groove 284. Therefore, the hydrodynamic clutch will be emptied which is desirable when the conditioning valve Q2 has been set to "Normal" or "Braking I" or "Braking II" to reduce the residual driving force transferred by the hydrodynamic clutch and the transmission shifted to the second speed ratio to the rear wheels, such residual force producing a tendency for the vehicle to creep forward.

The hydrodynamic clutch will be also emptied when the transmission has been shifted to the fourth speed ratio, since valve A' will be shifted to the left by pressure fluid supplied from duct 159 to the end space 282', it being understood that with this setting of the transmission the driving power will bypass the hydrodynamic clutch through friction clutch 210.

As will appear from Fig. 5, the casing 233 mounted in chamber 213 on the partition 212 surrounds the spaced shafts 207 and 216 and is provided with a plurality of parallel horizontal bores accommodating the conditioning valve Q2, the pressure control valve T, the pilot valves K2 and K3, and the relief valve A' controlling the hydrodynamic clutch. Moreover, there is a bore beneath and extending parallel to shaft 216 accommodating a valve U' which, as shown in Fig. 1, is a relief valve relieving the pressure prevailing in lines 132 and 191 by opening to discharge when such pressure exceeds a certain limit.

As shown in Fig. 5, the gear shift valves S2 and S3 are disposed adjacent to the shaft 216 so that short ducts only are required to put them into communication with the ducts 237 and 238 shown in Fig. 2. The gear shift valve S4 and the valve A' controlling the hydrodynamic clutch, however, are mounted adjacent to the shaft 207 and may be, therefore, put in communication with the ducts 239 and 240 shown in Fig. 2 by short communications. The majority of the valves shown in Fig. 5 are disposed transversely to the shafts 207 and 216.

The supplemental valve casing 234 carries the pressure step controller R, the supplemental conditioning valve Q1, the relief valve U and the pumps P and P2.

Most of the connecting conduits are formed by ducts provided in the casings 233 and 234. Some of the ducts are formed by bores provided in the partition 212.

From the foregoing explanations it will appear that the elements of the control system require a minimum of space and that the total length of their communicating conduits has been reduced to a minimum. The entire control system comprising gear shift valves, pilot valves, pumps, a pressure control valve, conditioning valves, and a pressure step controller is mounted in the space 213 disposed between the clutch aggregate consisting of clutches 202, 204, 208 and 210 connecting the transmission to the engine and the change speed gear aggregate consisting of gears 214, 215, 218, 219, 220 and 221, the casings 233 and 234 of the elements of the control system being mounted on a partition 212 of the transmission. One of the casings encases the pilot valves, the pressure control valve, one of the conditioning valves and the primary pump P1 being so mounted as to surround the driven shaft 209 and the secondary shaft 216 whereby the gear shift valves may be connected with the actuating rams through interior ducts of such shafts by means of comparatively short conduits. The other casing 234 is mounted coaxially to the reverse shaft 229 and carries the elements to be geared to the driven shaft 227, such as the pressure step controller R and the pumps P and P2. Moreover, this casing encloses the supplementary conditioning valve Q1 and the associated relief valve U.

Also, it will be noted that the member representative of the engine driving torque and acting on the pressure control valve, such as the diaphragm 95, is mounted coaxially to the pressure control valve T near the outer confinement of the transmission housing at a point adjacent to the mounting of kick-down lever 338 operable by the accelerator pedal. As a result, the diaphragm is easily accessible from the outside for repair and the diaphragm chamber may be readily connected with the intake manifold of the engine. Finally, it will be noted that the valve A' will empty the hydrodynamic clutch under certain conditions of operation so as to minimize eddy losses therein.

While I have described my invention with reference to a preferred embodiment thereof, it is to be clearly understood that the present invention is in no way limited to the details of such embodiment, but is capable of numerous modifications within the scope of the appended claims.

What I claim is:

1. In a drive mechanism, a drive transmitting clutch means, a change speed gear means, at least one transmission shaft connecting said clutch means with said change speed gear means, change speed clutches for said change speed gear means, hydraulic actuating means for actuating said change speed clutches, a casing including a first casing portion enclosing said clutch means, a second casing portion separable from said first casing portion and enclosing said change speed gear means, a transverse wall in said first casing portion and a transverse wall in said second casing portion spaced from said first-mentioned transverse wall, said transverse walls forming a chamber therebetween intermediate said clutch means and said change speed gear means with said casing portions connectingly assembled, said transmission shaft extending through said chamber, a control-housing within said chamber including a plurality of hydraulic control means and connecting means for connecting said hydraulic control means with said hydraulic actuating means, and securing means for securing said control-housing to one of said transverse walls.

2. The combination according to claim 1, further comprising another transmission shaft parallel to said first-mentioned transmission shaft, said control-housing being formed essentially plate-shaped with a bore surrounding said first-mentioned transmission shaft and another bore surrounding said another transmission shaft, wherein said control means include a plurality of control bores transverse to said transmission shafts and control valves in said control bores, and wherein said connecting means include channels connecting each of said control bores with one of said first-mentioned two bores, and further channels provided in at least one of said transmission shafts for connecting said first-mentioned channels with said hydraulic actuating means.

3. The combination according to claim 1, wherein said clutch means includes a hydrodynamic clutch, and means in said first-mentioned transmission shaft for connecting said hydraulic control means with said hydrodynamic clutch.

4. The combination according to claim 1, further comprising step controller means for supplying fluid to said hydraulic control means and said hydraulic actuating means, the transverse wall of said second casing portion being provided with an opening, means for securing said step controller means in said opening of said last-mentioned transverse wall from the side thereof of said chamber, and means for driving said step controller means by said change speed gear means.

5. In a transmission a change speed gear means, a casing surrounding said change speed gear means including two end walls enclosing the inside of said casing, a transmission shaft supported in said casing, hydraulic shifting means for shifting said change speed gear means, pressure step controller means for supplying a fluid to said hydraulic shifting means in dependence of a rotational speed of said change speed gear means, an aperture in one of said end walls of said casing coaxial with said shaft to enable emplacement of said pressure step controller means in said opening, means for securing said pressure step controller means in said opening, and coupling means for connecting said pressure step controller means to said transmission shaft to drive said pressure step controller means by said transmission shaft.

6. The combination according to claim 5, further comprising pump means for said fluid, said pump means being combined with said pressure step controller means into a unitary structure.

7. The combination according to claim 5, wherein said transmission shaft is a reverse shaft.

8. The combination according to claim 1, further comprising a driving engine, and wherein said hydraulic control means include a regulating member for regulating the pressure of the fluid supplied to at least some of said control means, adjusting means for said regulating member including a pressure responsive means, means for controlling said pressure responsive means by the vacuum in said engine, a lateral opening in said casing enclosing said chamber, a control housing containing said pressure responsive means, and means for operatively inserting said control housing in said lateral opening.

9. The combination according to claim 1, wherein said clutch means includes a hydrodynamic clutch, pump means, duct means for connecting said pump means to said hydrodynamic clutch including a two-position valve means interconnected in said duct means between said pump means and said hydrodynamic clutch, said valve means connecting said pump means to said hydrodynamic clutch in one position thereof and discharging the fluid from said hydrodynamic clutch in the other position thereof, and means for effecting said other position of said valve means in response to the pressure of the fluid in said duct means below a predetermined minimum.

10. In a transmission with input means and a hydrodynamic clutch, a change speed gear means following said hydrodynamic clutch and in at least one speed thereof being operatively interconnected with said clutch and in another speed thereof being operatively connected with said input means in by-passing relationship to said clutch, means including a source of hydraulic medium and a discharge line for alternately supplying and discharging a hydraulic medium to and from said hydrodynamic clutch, shifting means for said last-mentioned means, and control means for said shifting means operative to selectively move said shifting means from a first position thereof in which a communication is effectively established between said source and said clutch to a second position thereof in which a communication is effectively established between said clutch and said discharge line including speed responsive means responsive to the speed of said clutch to control said shifting means by said control means in such a manner that with said clutch exceeding a predetermined relatively low rotational speed, said clutch is filled with said hydraulic medium by moving said shifting means to said first position and with said clutch falling below said predetermined speed said hydraulic medium is discharged from said clutch.

11. In a transmission with a hydrodynamic clutch, a change speed gear means following said hydrodynamic clutch and having at least one speed thereof operatively interconnected with said clutch and another speed by-passing said clutch, hydraulic shifting means for the different speeds of said change speed gear means, means for supplying a hydraulic shifting medium to said hydraulic shifting means, a duct leading to said hydrodynamic clutch, a hydraulic pressure source connected to said duct, a shifting valve with at least two positions operatively connected in said duct including control means to open said duct in one position of said valve and to close said duct in another position thereof, means for conducting said hydraulic shifting medium to said shifting valve to tend to displace said valve in the opening direction thereof and to effect such displacement only with a pressure of said medium in excess of a predetermined value, and means connected to the hydraulic shifting means of said another speed by-passing said hydrodynamic clutch to conduct said medium to said valve upon engagement of said another speed so as to tend to displace said valve into the closing direction thereof.

12. The combination according to claim 11, further comprising spring means urging said valve into a closing position.

13. In a drive mechanism, a drive transmitting clutch means, a change speed gear means, at least one transmission shaft connecting said clutch means with said change speed gear means, change speed clutches for said change speed gear means, hydraulic actuating means for actuating said change speed clutches, a casing including a first casing portion enclosing said clutch means, a second casing portion separable from said first casing portion and enclosing said change speed gear means, a transverse wall in said first casing portion and a transverse wall in said second casing portion spaced from said first-mentioned transverse wall, said transverse walls forming a chamber therebetween intermediate said clutch means and said change speed gear means with said casing portions connectingly assembled, said transmission shaft extending through said chamber and through both transverse walls, a control-housing within said chamber including a plurality of hydraulic control means and connecting means for connecting said hydraulic control means with said hydraulic actuating means, and securing means for securing said control-housing to one of said transverse walls.

14. The combination according to claim 1 further comprising pump means, pressure step controller means, means for drivingly connecting said pressure step controller means to said shaft, said pressure step controller means being operative to control the pressure of said pump means in successive steps dependent on the speed of rotation of said shaft, and means for selectively varying the speed at which said pressure step controller means changes the pressure of said pump means in a step-like manner.

15. In a transmission input means, output means, change speed gear means providing at least two gear ratios and including a hydrodynamic clutch for operatively connecting said input means with said output means, control means for selectively effecting a first transmission ratio of said change speed gear means including said hydrodynamic clutch and for effecting a second transmission ratio by-passing said hydrodynamic clutch in the connection between said input means and said output means, means including a source of hydraulic medium and a discharge line for selectively supplying said a hydrodynamic medium to said clutch, and speed-responsive actuating means operatively connected with said control means to discharge said hydraulic medium from said hydrodynamic clutch over said discharge line during engagement by said control means of said second transmission ratio as well as during operation of said hydrodynamic clutch in said first transmission ratio below a predetermined rotational speed thereof.

16. In a control system for a motor vehicle, the combination comprising a pump for feeding a fluid under pressure, a slidably mounted relief valve member subjected to said fluid pressure and adapted to be moved thereby to successively uncover a plurality of discharge ports, a spring acting on said relief valve member in opposition to said fluid pressure, means movable in response to the rate of travel of said vehicle to successively block flow through said discharge ports as said rate increases to thereby create a step by step increase in pressure by said pump as such flow is blocked off, said means being formed by a centrifugal governor having a plurality of flyweights of different weight, each flyweight controlling the flow through one of said discharge ports, and springs individually coordinated to said flyweights, said springs being so correlated to said weights as to render said flyweights responsive to different speeds, and a spring-loaded stop provided within the path of said slidably mounted relief valve member, said spring loaded stop being spaced from said relief valve member when said relief valve member is in its starting position.

References Cited in the file of this patent

UNITED STATES PATENTS

| | | |
|---|---|---|
| 2,351,483 | Carnagua | June 13, 1944 |
| 2,547,236 | Swenson | Apr. 3, 1951 |
| 2,597,921 | Churchill et al. | May 27, 1952 |
| 2,619,848 | Carnagua | Dec. 2, 1952 |
| 2,676,497 | Ahlen | Apr. 27, 1954 |
| 2,790,328 | Forster | Apr. 30, 1957 |